United States Patent
D'Souza (10) Patent No.: US 10,739,044 B2
(45) Date of Patent: Aug. 11, 2020

(54) METHOD FOR INSTALLING EXPANSION DEVICE IN A SEALED SYSTEM

(71) Applicant: Haier US Appliance Solutions, Inc., Wilmington, DE (US)

(72) Inventor: Bryan Isaac D'Souza, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 138 days.

(21) Appl. No.: 15/914,032

(22) Filed: Mar. 7, 2018

(65) Prior Publication Data

US 2019/0277543 A1 Sep. 12, 2019

(51) Int. Cl.
*F25B 13/00* (2006.01)
*F24F 13/30* (2006.01)
(Continued)

(52) U.S. Cl.
CPC .............. *F25B 13/00* (2013.01); *F24F 13/30* (2013.01); *F25B 41/04* (2013.01); *F25B 41/062* (2013.01);
(Continued)

(58) Field of Classification Search
CPC .. F24F 13/30; F24F 11/84; F24F 11/30; F24F 11/70; F24F 11/85; F24F 3/06; F24F 3/065; F24F 3/08; F24F 3/10; F16K 35/00; F16K 35/16; F16K 11/0704; F16K 35/06; F16K 35/12; F16K 35/14; G05D 7/0623; G05D 7/0629; Y10T 29/49359; Y10T 29/49721; Y10T 29/4973; Y10T 29/4997; Y10T 29/49966; F25B 13/00; F25B 2600/2513; F25B 41/04; F25B 2313/005; F25B 41/06; F25B 41/062
(Continued)

(56) References Cited

U.S. PATENT DOCUMENTS 1,679,370 A * 8/1928 Nordstrom .............. F16K 35/06
251/94
3,316,338 A * 4/1967 Rieke .................. B29C 65/4815
264/267
(Continued)

FOREIGN PATENT DOCUMENTS

CN 202757360 U 2/2013
JP 2015072119 A 4/2015

OTHER PUBLICATIONS

JP 201505072119 A English Translation (Year: 2015).*
(Continued)

*Primary Examiner* — Jason L Vaughan
(74) *Attorney, Agent, or Firm* — Dority & Manning, P.A.

(57) ABSTRACT

A sealed system and a method of assembling the sealed system include installing an expansion device such as an electronic expansion valve (EEV) between an indoor heat exchanger and an outdoor heat exchanger. Before or after the expansion device is installed, a predetermined stop position of an adjustable valve is determined, e.g., based on the sealed system capacity. A removable motor assembly moves the adjustable valve to the predetermined stop position and the adjustable valve is permanently fixed within the expansion device, e.g., by removing the motor assembly and/or melting a locking member positioned within the expansion device.

17 Claims, 8 Drawing Sheets

(51) Int. Cl.
*F25B 41/04* (2006.01)
*F25B 41/06* (2006.01)

(52) U.S. Cl.
CPC ... *F25B 2600/2513* (2013.01); *Y10T 29/4997* (2015.01); *Y10T 29/49359* (2015.01); *Y10T 29/49721* (2015.01)

(58) Field of Classification Search
USPC .............................. 251/89, 116; 137/383, 385
See application file for complete search history.

(56) References Cited

U.S. PATENT DOCUMENTS

| | | | | | |
|---|---|---|---|---|---|
| 4,346,558 | A | * | 8/1982 | Bernett | F16K 17/38 169/37 |
| 4,523,436 | A | * | 6/1985 | Schedel | F25B 41/062 251/129.11 |
| 4,586,624 | A | * | 5/1986 | Shaw | B29C 66/542 220/613 |
| 4,756,857 | A | * | 7/1988 | Dezio | B29C 65/42 264/40.1 |
| 4,911,404 | A | * | 3/1990 | Dorste | F16K 31/04 251/129.08 |
| 4,928,494 | A | * | 5/1990 | Glamm | F16K 31/04 137/901 |
| 4,986,085 | A | * | 1/1991 | Tischer | F16K 31/04 251/129.11 |
| 4,993,902 | A | * | 2/1991 | Hellon | F16B 37/14 411/303 |
| 5,205,312 | A | * | 4/1993 | Jerman | E03B 9/06 137/15.02 |
| 5,237,735 | A | * | 8/1993 | Grossmann | F16B 39/02 156/272.2 |
| 5,626,030 | A | * | 5/1997 | Nagai | F16K 1/54 62/324.6 |
| 5,628,201 | A | * | 5/1997 | Bahel | F24F 11/70 62/211 |
| 6,994,106 | B1 | * | 2/2006 | Hackley | E03B 9/06 137/382 |

OTHER PUBLICATIONS

Alco Controls, Heritage Parts, Jul. 22, 2017 (Year: 2017).*
ESX14, Stepper Motor Expansion Valve, 2008 (Year: 2008).*
Parker Step Motor Expansion Valve, 2016 (Year: 2016).*
Stepper Motor vs Width Modulation, Nov. 2012 (Year: 2012).*
The Emerson Valves and Electronic Controls Solution, 2008 (Year: 2008).*
The News—Electronic Expansion Valves The Basics, Jul. 28, 2004 (Year: 2004).*

* cited by examiner

METHOD FOR INSTALLING EXPANSION DEVICE IN A SEALED SYSTEM

FIELD OF THE INVENTION

The present subject matter relates generally to refrigeration systems, and more particularly to methods of assembling sealed systems including expansion devices.

BACKGROUND OF THE INVENTION

Refrigeration systems are generally utilized to adjust the temperature within a certain area. In the case of air conditioner units, one or more units may operate to adjust the temperature within structures such as dwellings and office buildings. In particular, one-unit type room air conditioner units may be utilized to adjust the temperature in, for example, a single room or group of rooms of a structure. Such air conditioner units may include, for instance, a sealed system to cool or heat the room. The sealed system may include a compressor, one or more heat exchangers, and an expansion device.

Expansion devices are used in sealed systems to permit the controlled expansion of a refrigerant, e.g., to lower its temperature before passing through an evaporator to provide a cooling effect. Notably, the expansion devices used within a given sealed system must be carefully selected to properly regulate the flow of refrigerant and improve system performance. As a result, manufacturers that make different models of air conditioner units using the same general platform often use different copper capillary tube assemblies in order to manage the different capacity requirements of each model. Thus, additional design for system compatibility must be performed and supply chain maintenance is complicated because the manufacturer must procure, store, and install many different types and sizes of expansion devices.

Accordingly, a versatile expansion device that may be used in multiple air conditioner units would be useful. More specifically, an expansion device that may be used in sealed systems having various capacities and which is easy to install and configure would be particularly beneficial.

BRIEF DESCRIPTION OF THE INVENTION

Aspects and advantages of the invention will be set forth in part in the following description, may be obvious from the description, or may be learned through practice of the invention.

In accordance with one embodiment, a method of assembling a sealed system comprising an expansion device is provided. The method includes installing the expansion device between an indoor heat exchanger and an outdoor heat exchanger, the expansion device comprising an adjustable valve. The method further includes obtaining a predetermined stop position of the adjustable valve, operating a motor assembly to move the adjustable valve to the predetermined stop position, and fixing the adjustable valve in the predetermined stop position.

In accordance with another embodiment, a method of assembling a sealed system is provided. The sealed system includes an expansion device having an adjustable valve. The method includes obtaining a predetermined stop position of the adjustable valve, operating a motor assembly to move the adjustable valve to the predetermined stop position, and fixing the adjustable valve in the predetermined stop position. The method then includes installing the expansion device between an indoor heat exchanger and an outdoor heat exchanger of the sealed system.

In accordance with still another embodiment, an air conditioner unit is provided including an outdoor heat exchanger, an indoor heat exchanger, and a compressor operable to urge a flow of refrigerant through the indoor heat exchanger and the outdoor heat exchanger. An expansion device includes an adjustable valve, the expansion device being fluidly coupling the indoor heat exchanger to the outdoor heat exchanger. A removable motor assembly moves the adjustable valve to a predetermined stop position based on a capacity of the air conditioner unit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
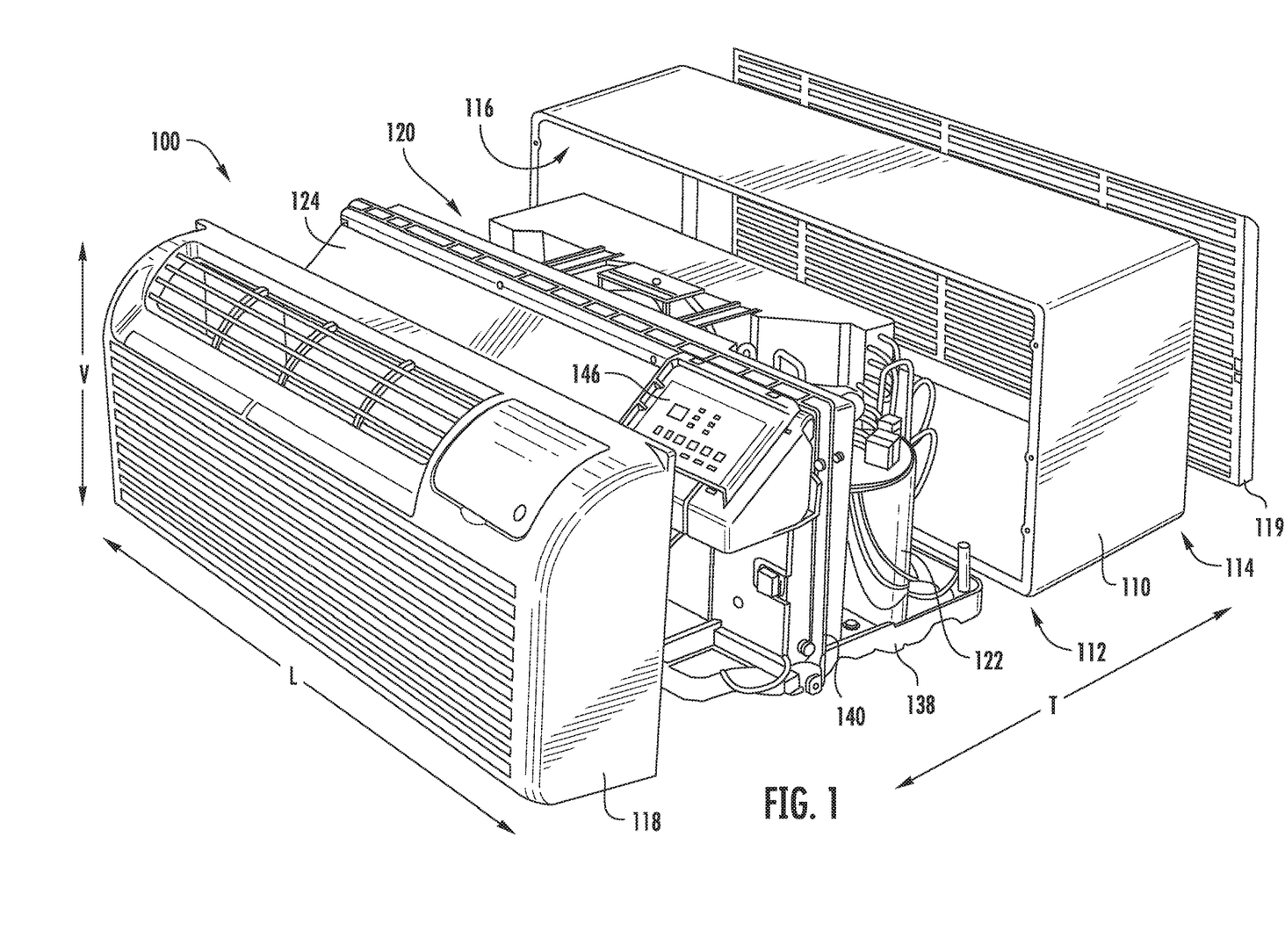
FIG. 1 provides an exploded perspective view of a packaged terminal air conditioner unit according to example embodiments of the present disclosure.

FIG. 1 provides an exploded perspective view of a packaged terminal air conditioner unit 100 according to example embodiments of the present disclosure. Generally, packaged terminal air conditioner unit 100 is operable to generate chilled and/or heated air in order to regulate the temperature of an associated room or building. As will be understood by those skilled in the art, packaged terminal air conditioner unit 100 may be utilized in installations where split heat pump systems are inconvenient or impractical. As discussed in greater detail below, a sealed system 120 (i.e., sealed heat exchange system) of packaged terminal air conditioner unit 100 is disposed within a casing 110. Thus, packaged terminal air conditioner unit 100 may be a self-contained or autonomous system for heating and/or cooling air. Packaged terminal air conditioner unit 100 defines a vertical direction V, a lateral direction L, and a transverse direction T that are mutually perpendicular and form an orthogonal direction system.

As used herein, the term "packaged terminal air conditioner unit" is applied broadly. For example, packaged terminal air conditioner unit 100 may include a supplementary electric heater (not shown) for assisting with heating air within the associated room or building without operating the sealed system 120. However, as discussed in greater detail below, packaged terminal air conditioner unit 100 may also include a heat pump heating mode that utilizes sealed system 120, e.g., in combination with an electric resistance heater, to heat air within the associated room or building. Indeed, aspects of the present subject matter may have applications involving sealed systems in any air conditioner unit or in other appliances using sealed systems, such as refrigeration appliances.

As may be seen in FIG. 1, casing 110 extends between an interior side portion 112 and an exterior side portion 114. Interior side portion 112 of casing 110 and exterior side portion 114 of casing 110 are spaced apart from each other. Thus, interior side portion 112 of casing 110 may be positioned at or contiguous with an interior atmosphere, and exterior side portion 114 of casing 110 may be positioned at or contiguous with an exterior atmosphere. Sealed system 120 includes components for transferring heat between the exterior atmosphere and the interior atmosphere, as discussed in greater detail below.

Casing 110 defines a mechanical compartment 116. Sealed system 120 is disposed or positioned within mechanical compartment 116 of casing 110. A front panel 118 and a rear grill or screen 119 hinder or limit access to mechanical compartment 116 of casing 110. Front panel 118 is positioned at or adjacent interior side portion 112 of casing 110, and rear screen 119 is mounted to casing 110 at exterior side portion 114 of casing 110. Front panel 118 and rear screen 119 each define a plurality of holes that permit air to flow through front panel 118 and rear screen 119, with the holes sized for preventing foreign objects from passing through front panel 118 and rear screen 119 into mechanical compartment 116 of casing 110.

Packaged terminal air conditioner unit 100 also includes a drain pan or bottom tray 138 and an inner wall or bulkhead 140 positioned within mechanical compartment 116 of casing 110. Sealed system 120 is positioned on bottom tray 138. Thus, liquid runoff from sealed system 120 may flow into and collect within bottom tray 138. Bulkhead 140 may be mounted to bottom tray 138 and extend upwardly from bottom tray 138 to a top wall of casing 110. Bulkhead 140 limits or prevents air flow between interior side portion 112 of casing 110 and exterior side portion 114 of casing 110 within mechanical compartment 116 of casing 110. Thus, bulkhead 140 may divide mechanical compartment 116 of casing 110.

Packaged terminal air conditioner unit 100 further includes a controller 146 with user inputs, such as buttons, switches and/or dials. Controller 146 regulates operation of packaged terminal air conditioner unit 100. Thus, controller 146 is operably coupled to various components of packaged terminal air conditioner unit 100, such as components of sealed system 120 and/or a temperature sensor, such as a thermistor or thermocouple, for measuring the temperature of the interior atmosphere. In particular, controller 146 may selectively activate sealed system 120 in order to chill or heat air within sealed system 120, e.g., in response to temperature measurements from the temperature sensor.

In some embodiments, controller 146 includes memory and one or more processing devices. For instance, the processing devices may be microprocessors, CPUs or the like, such as general or special purpose microprocessors operable to execute programming instructions or microcontrol code associated with operation of packaged terminal air conditioner unit 100. The memory can represent random access memory such as DRAM, or read only memory such as ROM or FLASH. The processor executes programming instructions stored in the memory. The memory can be a separate component from the processor or can be included onboard within the processor. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
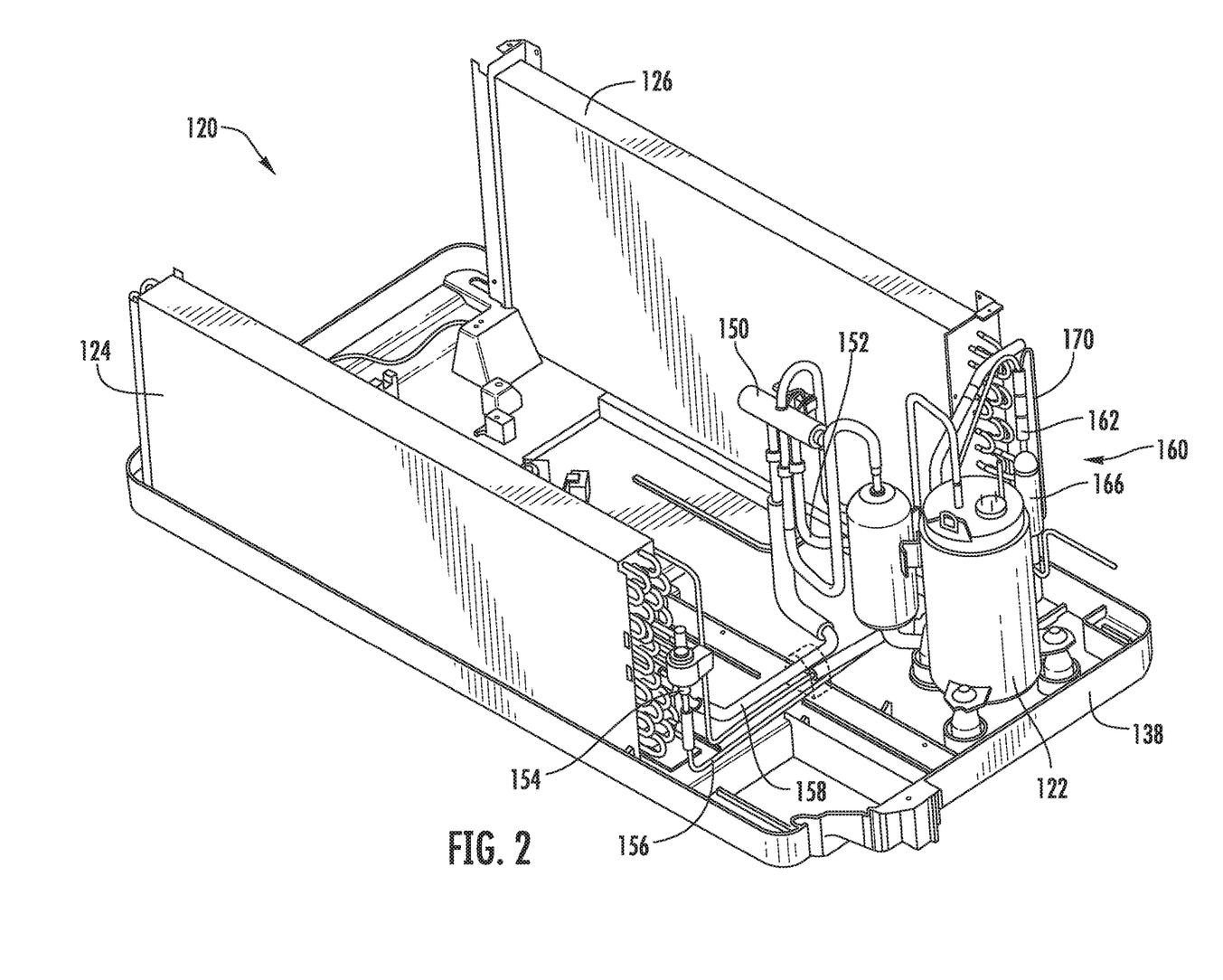
FIG. 2 provides a perspective view of a sealed system of the example packaged terminal air conditioner unit of FIG. 1.
Figure 3:
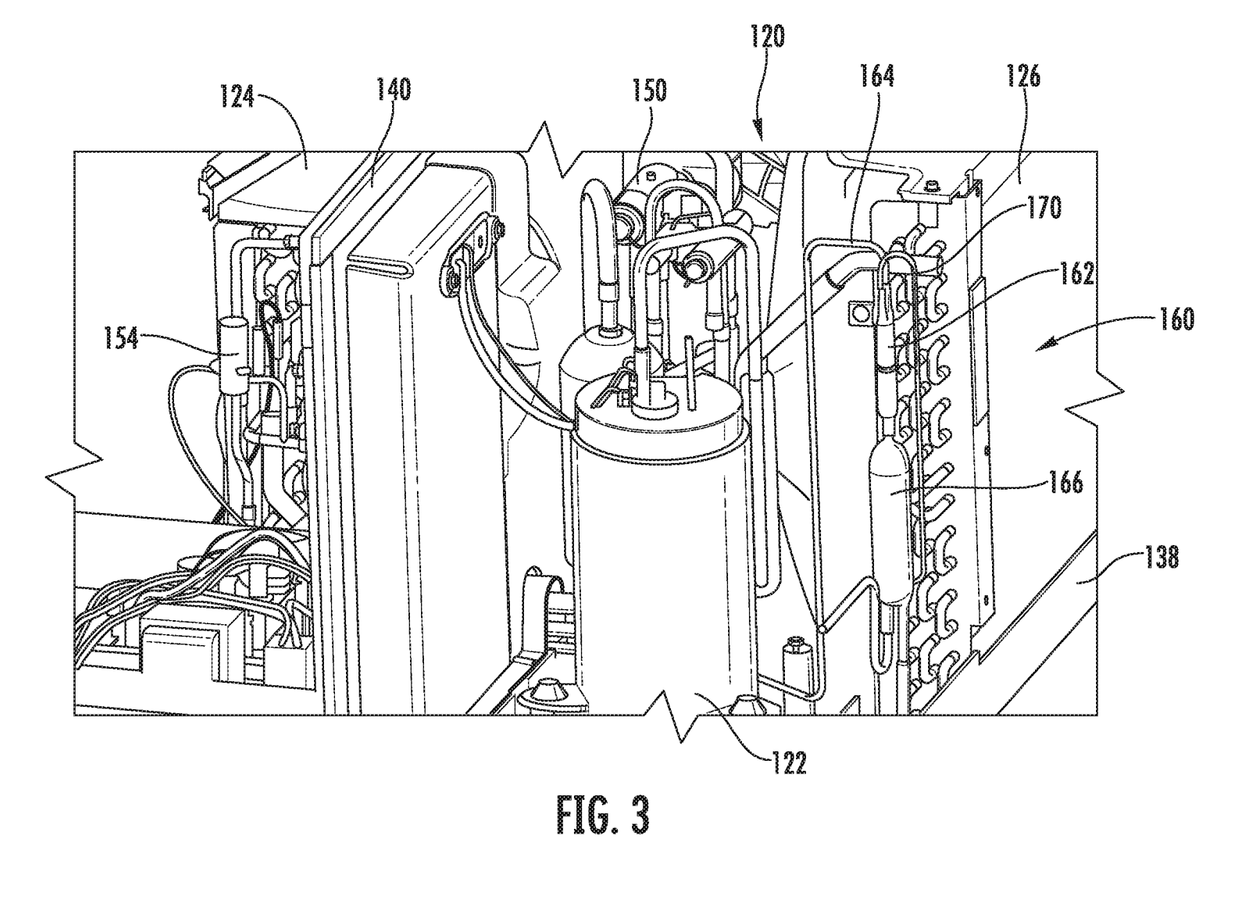
FIG. 3 provides another perspective view of a sealed system of the example packaged terminal air conditioner unit of FIG. 1.
Figure 4:
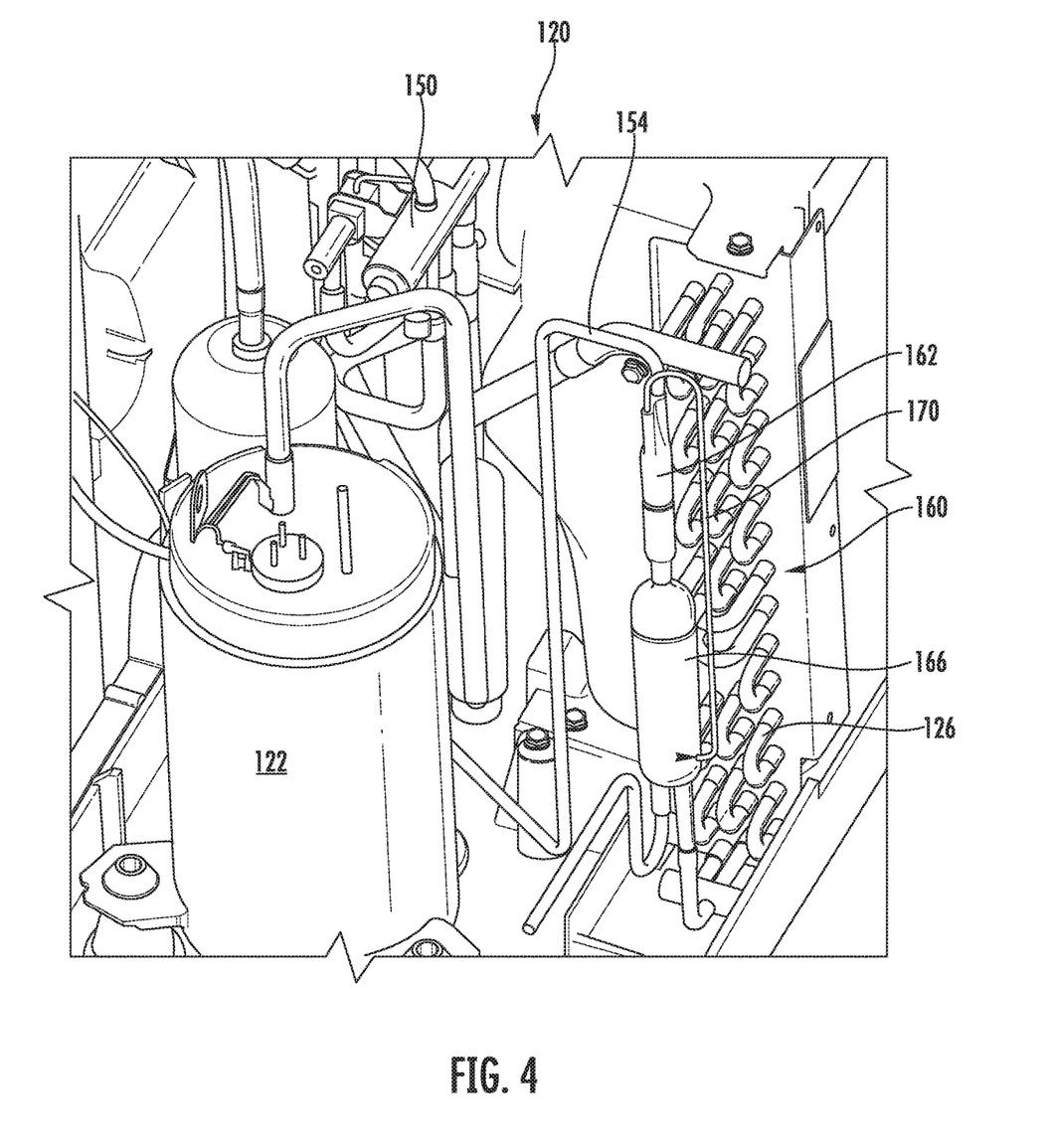
FIG. 4 provides another perspective view of a sealed system of the example packaged terminal air conditioner unit of FIG. 1.
Figure 5:
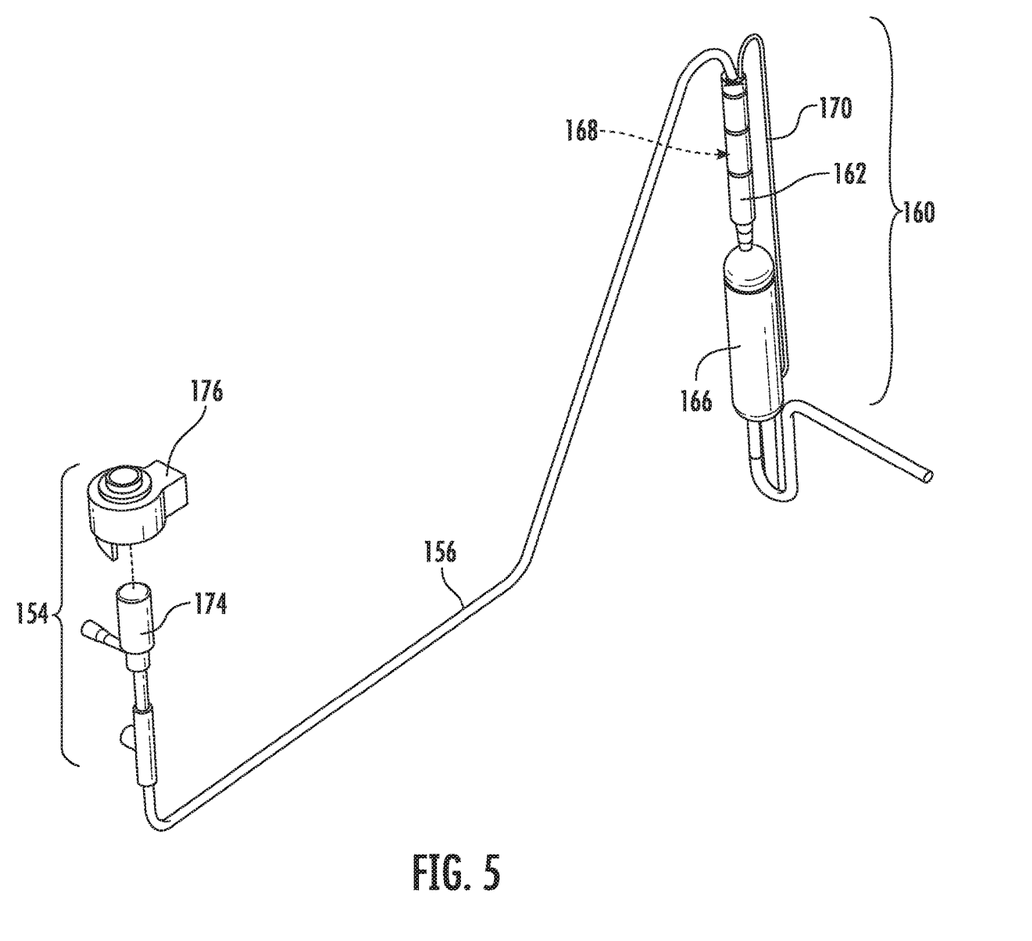
FIG. 5 provides a perspective view of a portion of the example sealed system of FIG. 2.

FIGS. 2 through 4 provide various perspective views of certain components of packaged terminal air conditioner unit 100, including sealed system 120. FIG. 5 provides a perspective view of a portion of line filter assembly 160. As shown, sealed system 120 includes a compressor 122, an interior heat exchanger or coil 124 and an exterior heat exchanger or coil 126. As is generally understood, compressor 122 is generally operable to circulate or urge a flow of refrigerant through sealed system 120, which may include various conduits which may be utilized to flow refrigerant between the various components of sealed system 120. Thus, interior coil 124 and exterior coil 126 may be between and in fluid communication with each other and compressor 122.

As will be described in further detail below, sealed system 120 may operate in a cooling mode and, alternately, a heating mode. During operation of sealed system 120 in the cooling mode, refrigerant generally flows from interior coil 124 and to compressor 122. During operation of sealed system 120 in the heating mode, refrigerant generally flows from exterior coil 126 and to compressor 122. As will be explained in more detail below, a compression reversing valve 150 in fluid communication with compressor 122 may control refrigerant flow to and from compressor 122, as well as the coils 124, 126.

During operation of sealed system 120 in the cooling mode, refrigerant flows from interior coil 124 and to compressor 122. For example, refrigerant may exit interior coil 124 as a fluid in the form of a superheated vapor. Upon exiting interior coil 124, the refrigerant may enter compressor 122, which is operable to compress the refrigerant. Accordingly, the pressure and temperature of the refrigerant may be increased in compressor 122 such that the refrigerant becomes a more superheated vapor.

Exterior coil 126 is disposed downstream of compressor 122 in the cooling mode and acts as a condenser. Thus, exterior coil 126 is operable to reject heat into the exterior atmosphere at exterior side portion 114 of casing 110 when sealed system 120 is operating in the cooling mode. For example, the superheated vapor from compressor 122 may enter exterior coil 126 via a first distribution conduit 152 (FIG. 2) that extends between and fluidly connects compression reversing valve 150 and exterior coil 126. Within exterior coil 126, the refrigerant from compressor 122 transfers energy to the exterior atmosphere and condenses into a saturated liquid and/or liquid vapor mixture. An exterior air handler or fan (not shown) is positioned adjacent exterior coil 126 and may facilitate or urge a flow of air from the exterior atmosphere across exterior coil 126 in order to facilitate heat transfer.

According to the illustrated embodiment, an expansion device or a variable electronic expansion valve 154 may be further provided to regulate refrigerant expansion. Specifically, variable electronic expansion valve 154 is disposed along a fluid conduit 156 that extends between interior coil 124 and exterior coil 126. During use, variable electronic expansion valve 154 may generally expand the refrigerant, lowering the pressure and temperature thereof. In the cooling mode, refrigerant, which may be in the form of high liquid quality/saturated liquid vapor mixture, may exit exterior coil 126 and travel through variable electronic expansion valve 154 before flowing through interior coil 124. In the heating mode, refrigerant, may exit interior coil 124 and travel through variable electronic expansion valve 154 before flowing to exterior coil 126. As described in more detail below, variable electronic expansion valve 154 is generally configured to be adjustable. In other words, the flow (e.g., volumetric flow rate in milliliters per second) of refrigerant through variable electronic expansion valve 154 may be selectively varied or adjusted.

Interior coil 124 is disposed downstream of variable electronic expansion valve 154 in the cooling mode and acts as an evaporator. Thus, interior coil 124 is operable to heat refrigerant within interior coil 124 with energy from the interior atmosphere at interior side portion 112 of casing 110 when sealed system 120 is operating in the cooling mode. For example, the liquid or liquid vapor mixture refrigerant from variable electronic expansion valve 154 may enter interior coil 124 via fluid conduit 156. Within interior coil 124, the refrigerant from variable electronic expansion valve 154 receives energy from the interior atmosphere and vaporizes into superheated vapor and/or high quality vapor mixture. An interior air handler or fan (not shown) is positioned adjacent interior coil 124 and may facilitate or urge a flow of air from the interior atmosphere across interior coil 124 in order to facilitate heat transfer. From interior coil 124, refrigerant may return to compressor 122 from compression reversing valve 150, e.g., via a second conduit 158 (FIG. 2) that extends between and fluidly connects interior coil 124 and compression reversing valve 150.

During operation of sealed system 120 in the heating mode, compression reversing valve 150 reverses the direction of refrigerant flow from compressor 122. Thus, in the heating mode, interior coil 124 is disposed downstream of compressor 122 and acts as a condenser, e.g., such that interior coil 124 is operable to reject heat into the interior atmosphere at interior side portion 112 of casing 110. In addition, exterior coil 126 is disposed downstream of variable electronic expansion valve 154 in the heating mode and acts as an evaporator, e.g., such that exterior coil 126 is operable to heat refrigerant within exterior coil 126 with energy from the exterior atmosphere at exterior side portion 114 of casing 110.

Referring to FIGS. 2 through 5, a line filter assembly 160 will be described according to an exemplary embodiment of the present subject matter. In general, line filter assembly 160 is positioned between and fluidly couples indoor heat exchanger 124 and outdoor heat exchanger 126. According to the illustrated exemplary embodiment, line filter assembly 160 includes a housing 162 that defines a flow chamber through which the flow of refrigerant may pass during operation of sealed system 120. In this regard, line filter assembly 160 is fluidly coupled to fluid conduit 156 that extends between indoor heat exchanger 124 and outdoor heat exchanger 126. However, it should be appreciated that according to alternative embodiments, line filter assembly 160 may be positioned at any other suitable location within sealed system 120.

Line filter assembly 160 may further include a line filter 166 that is positioned between indoor heat exchanger 124 and outdoor heat exchanger 126. Line filter 166 is generally configured for removing or collecting contaminants from the flow of refrigerant, such as byproducts from brazing or other manufacturing processes, that may have accumulated in sealed system 120 (e.g., during assembly) and might otherwise damage moving elements (e.g., compressor 122) or restrict small orifices (e.g., at expansion device 154). In this regard, line filter 166 may generally define a filter chamber that contains or holds a filter media (not shown) to collect contaminates as a flow of refrigerant is directed therethrough.

Additionally or alternatively, line filter 166 may contain or hold a desiccant material, such as a zeolite molecular sieve, to remove undesired moisture that may be present in sealed system 120. In some embodiments, line filter 166 is a uni-directional filter configured to filter flowed refrigerant in a single direction (e.g., the "cooling direction"). According to still other embodiments, line filter 166 may include one or more filter screens (not shown) which are configured for retaining the filter media and/or desiccant material within the filter chamber.

Notably, as described above, sealed system 120 is configured for two modes of operation (e.g., heating and cooling) which are achieved by reversing the flow of refrigerant within sealed system 120. However, reversing the flow of refrigerant through line filter 166 will have a tendency to eject all collected particles or contaminants out of the filter media, back into the flow of refrigerant, and into outdoor heat exchanger 126. To prevent this, a check valve 168 (FIG. 5) may be positioned downstream of line filter 166 or the filter media when the flow is passing in the cooling mode direction.

However, by preventing the flow of refrigerant circulating through line filter 166 in a reverse direction, sealed system 120 must include some feature or path for allowing circulation of the flow of refrigerant in that reverse direction, e.g., around line filter 166. According to the illustrated embodiment, this is achieved by including a bypass conduit 170 that provides fluid communication between a bypass port defined on top of housing 162 and a location upstream of the filter media (e.g., in the cooling mode), such as between the filter media and outdoor heat exchanger 126.

Figure 6:
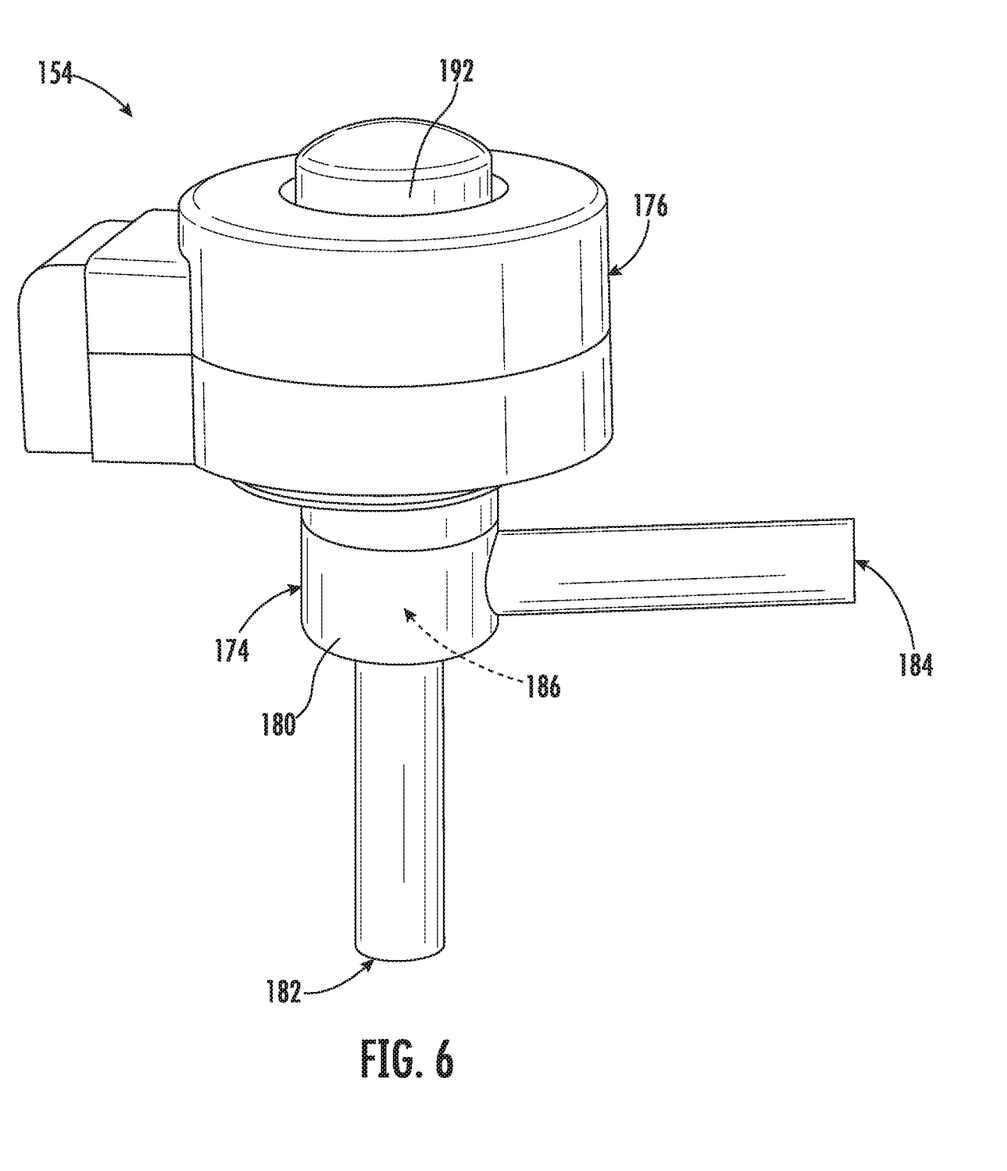
FIG. 6 provides a perspective view of an expansion device that may be used within the exemplary sealed system of FIG. 2.
Figure 7:
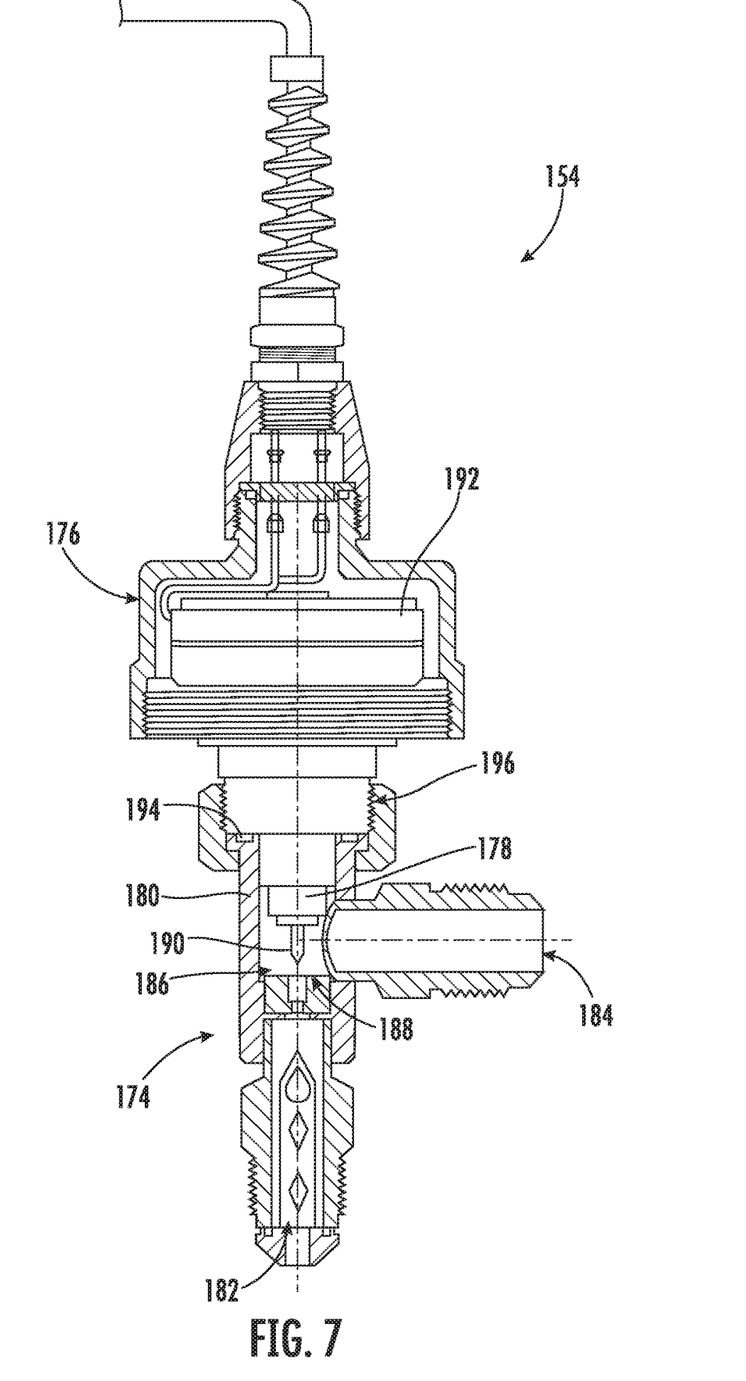
FIG. 7 provides a cross sectional view of the exemplary expansion device according to an exemplary embodiment of the present subject matter.

Referring now specifically to FIGS. 5 through 7, expansion device 154 will be described in more detail according to an exemplary embodiment of the present subject matter. Specifically, as mentioned above, the illustrated expansion device 154 is an electronic expansion valve (EEV). Another common type of expansion device used in refrigeration and the air conditioning systems is the capillary tube. Capillary tubes are typically copper tubes having a very small internal diameter for generating a flow restriction and resulting decrease in pressure. Notably, the pressure drop through a capillary tube is higher for tubes having smaller internal diameters and longer length. Therefore, capillary tubes are typically coiled to permit a longer run of run (and thus greater expansion) in a small space.

However, capillary tubes are typically not adjustable. Therefore, the flow or refrigerant through the capillary tube cannot be controlled as it may in an automatic throttling valve or an electronic expansion valve. Therefore, capillary tubes are typically designed for operation with a specific sealed system and for relatively specific ambient conditions. Specifically, capillary tubes are typically limited in their ability to efficiently regulate refrigerant in response to changing sealed system types or operating conditions. Notably, manufacturers of appliances such as refrigerators, air conditioners, or any other appliances using sealed systems typically must have different expansion devices designed for each model of those appliances. The manufacturers must also procure and store these devices and have different procedures and tools for installing each device in the associated appliance.

By contrast, as explained below according to an exemplary embodiment, electronic expansion valves (EEVs) are a type of expansion device that is controlled by an electronic circuit or driving coil which is configured for controlling the flow of refrigerant through the EEV. Several types of EEVs and methods of operation are possible, such as solenoid controlled open/close valves, analog valves that generate a variable magnetic field, with a stronger magnetic field opening the valve further. However, for the purposes of the discussion herein, the exemplary EEV is controlled by a driving coil or stepper motor that incrementally regulates the position of a valve between discrete positions to selectively regulate the flow of refrigerant through the EEV. It should be appreciated that aspects of the present subject matter may utilize any suitable EEV or other expansion device.

Referring specifically to the illustrated embodiment of FIGS. 5 through 7, expansion device 154 generally includes a valve assembly 174 and a motor assembly 176. Valve assembly 174 generally includes an adjustable valve 178 positioned within a valve housing 180. Valve housing 180 further includes a first port 182 (e.g., an inlet) and a second port 184 (e.g., an outlet) for passing flows of refrigerant. First port 182 and second port 184 are in fluid communication with a valve chamber 186 defined by valve housing 180. A valve seat 188 is positioned within valve housing 180 for regulating the flow of refrigerant through valve chamber 186. Specifically, adjustable valve 178 includes a restricting pin 190 that is moved into and out of engagement with valve seat 188 to progressively restrict the flow of refrigerant therethrough.

Motor assembly 176 is configured for selectively positioning the adjustable valve 178 within valve chamber 186. In this regard, according to the exemplary embodiment, motor assembly 176 includes a driving coil or stepper motor 192 that selectively positioned adjustable valve 178 to achieve the desired flow restriction and corresponding expansion of a flow of refrigerant through valve assembly 174. In this regard, stepper motor 192 rotates a fraction of a revolution for each signal sent by a controller, such as controller 146. As a result, stepper motor 192 may move adjustable valve 178 between many different positions between the fully open and fully closed position very precisely.

Whether driven by stepper motor 192 or another actuator, the ability of an EEV (such as expansion device 154) to rotate to a precise position makes it ideal for use with various models of a sealed system. For example, a manufacturer of an air conditioner unit may have models that operate at 7000, 9000, 12000, and 15000 British thermal units per hour (BTUs/hr). An appropriate valve position for these four models may be, for example, 120, 180, 220, and 270 steps, respectively. As a result, that manufacturer could have a single EEV in stock for use in all four models instead of separate expansion devices for each model. A technician installing the expansion device could install each of the expansion devices using the same process, but adjust the position of the valve by controlling the steps taken by stepper motor 192. Specifically, an exemplary method is described below which permits a manufacturer to use a single driving coil or stepper motor 192 to set every expansion device installed, e.g., by having a dedicated driving coil that may be operably coupled to each expansion device to properly position the valve prior to removal.

Thus, according to the exemplary embodiment, motor assembly 176 is removable from valve assembly 174. Specifically, motor assembly 176 may be used to move adjustable valve 178 to the desired position and may then be removed to fix adjustable valve 178 in the desired position. In this regard, after motor assembly 176 is removed from valve assembly 174, adjustable valve 178 remains in position to maintain a consistent flow restriction through valve assembly 174.

In certain situations, adjustable valve 178 may have a tendency to "drift" or move out of the desired position during operation. To prevent this, valve assembly 174 may include additional features for fixing the position of adjustable valve 178 after it has been moved to the desired position. For example, according to the illustrated embodiment, expansion device 154 includes a locking member 194 that is configured for preventing movement of adjustable valve 178 during operation. For example, locking member 194 may be a washer made of plastic or another suitable material that may be melted after adjustable valve 178 has been positioned as desired. The melted locking member 194 may have the effect of binding adjustable valve 178 to prevent further movement.

Although a melted washer is described herein, it should be appreciated that locking member 194 may be any other device, component, or feature configured for fixing adjustable valve 178 at the desired position. For example, locking member 194 may be a clip or locking pin that slides into valve assembly 178 after positioning to engage adjustable valve 178 and prevent further movement. Alternatively, locking member 194 may be a thin layer of Loctite or other thread locking material for preventing stepper motor 192 from rotating adjustable valve 178 any further. For example, the thread locking material may coats threads 196 to lock adjustable valve 178. For example, the threads may be coated with a heat-activated thread locker to lock threads 196 and prevent movement of adjustable valve 178 after the desired position is reached.

Figure 8:
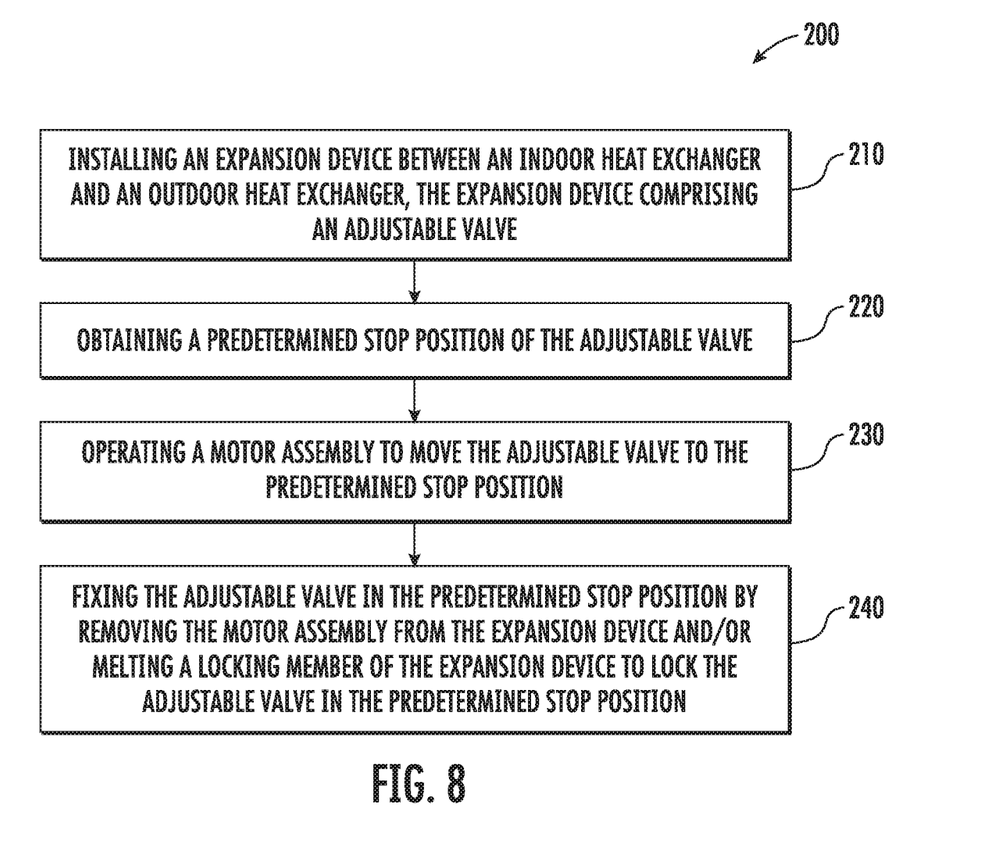
FIG. 8 provides an exemplary method for assembling a sealed system including an expansion device according to an exemplary embodiment.

Referring now to FIG. 8, an exemplary method 200 of assembling a sealed system including an expansion device will be described according to an exemplary embodiment of the present subject matter. Method 200 may be used to install an expansion device in any suitable sealed system, e.g., for an air conditioner unit, a refrigeration appliance, or in any other suitable application. According to an exemplary embodiment, controller 146 of air conditioner unit 100 may be programmed or configured to implement method 200. Thus, method 200 is discussed in greater detail below with reference to air conditioner unit 100, although it should be appreciated that method 200 is not limited to such an application.

Method 200 includes, at step 210, installing an expansion device between an indoor heat exchanger and an outdoor heat exchanger of a sealed system. For example, continuing the example from above, expansion device 154 may be installed on fluid conduit 156, e.g., by brazing first port 182 and second port 184 onto open ends of fluid conduit 156.

Step 220 includes obtaining a predetermined stop position of an adjustable valve of the expansion device. In general, the predetermined stop position may be selected such that the desired expansion of the refrigerant is achieved. This stop position may be based on a capacity of the sealed system, e.g., based on a desired flow rate of refrigerant or associated with a BTU/hr capacity of the unit. Notably, by adjusting the adjustable valve in the factory, a manufacturer may purchase expansion devices having an operating capacity suitable for their highest capacity models. The expansion devices may then be throttled down to achieve the capacity of other models during the installation process. This permits the manufacturer to procure, store, and install only a single model or type of expansion valve, instead of different expansion devices for each model.

Step 230 includes operating a motor assembly to move the adjustable valve to the predetermined stop position. Notably, the motor assembly may be removable from the expansion device after moving the adjustable valve to the predetermined stop position. In this manner, a single motor assembly may be used on the assembly line to adjust the position of the expansion device for each particular unit. This reduces the cost of extra motors associated with each valve.

Method 200 further includes, at step 240, fixing the adjustable valve in the predetermined stop position. In this regard, after the position of the adjustable valve is set to the desired predetermined stop position to achieve the desired refrigerant flow, motor assembly may be removed and/or other means of locking the adjustable valve in the predetermined stop position may be used. For example, as described above, a locking member may be positioned within the expansion device which may be melted to bind, fix, or otherwise lock the adjustable valve in the predetermined stop position.

Although method 200 is described as including the step of installing the expansion device (step 210) before adjusting and fixing the adjustable valve (steps 230-240), it should be appreciated these steps could be swapped according to an alternative embodiment. For example, the predetermined stop position could be determined, the adjustable valve could be moved, and the adjustable valve could be fixed prior to installation of expansion device into the sealed system. Other variations and modifications to method 200 are possible and within the scope of the present subject matter.

FIG. 8 depicts an exemplary control method and models having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using sealed system 120 and air conditioner unit 100 as an example, it should be appreciated that these methods may be used to assemble a sealed system in any suitable appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of assembling a sealed system comprising an expansion device, the method comprising:
   installing the expansion device between an indoor heat exchanger and an outdoor heat exchanger, the expansion device comprising an adjustable valve;
   obtaining a predetermined stop position of the adjustable valve;
   operating a motor assembly to move the adjustable valve to the predetermined stop position;
   fixing the adjustable valve in the predetermined stop position; and
   wherein fixing the adjustable valve in the predetermined stop position includes melting a locking member of the expansion device to lock the adjustable valve in the predetermined stop position.

2. The method of claim 1, wherein fixing the adjustable valve in the predetermined stop position comprises:
   removing the motor assembly from the expansion device.

3. The method of claim 1, wherein the locking member is a piece of plastic positioned proximate the adjustable valve.

4. The method of claim 1, wherein the motor assembly is used to move adjustable valves within multiple expansion devices.

5. The method of claim 1, wherein the predetermined stop position is based on a capacity of the sealed system.

6. The method of claim 1, wherein the motor assembly comprises a stepper motor.

7. The method of claim 1, wherein installing the expansion device comprises:
   brazing the expansion device onto fluid conduit extending between the indoor heat exchanger and the outdoor heat exchanger.

8. The method of claim 1, wherein the sealed system is part of an air conditioner or a refrigeration system.

9. A method of assembling a sealed system, the sealed system comprising an expansion device having an adjustable valve, the method comprising:
   obtaining a predetermined stop position of the adjustable valve;
   operating a motor assembly to move the adjustable valve to the predetermined stop position;
   fixing the adjustable valve in the predetermined stop position;
   installing the expansion device between an indoor heat exchanger and an outdoor heat exchanger of the sealed system; and
   wherein fixing the adjustable valve in the predetermined stop position includes removing the motor assembly from the expansion device.

10. The method of claim 9, wherein fixing the adjustable valve in the predetermined stop position comprises:

melting a locking member of the expansion device to lock the adjustable valve in the predetermined stop position.

11. The method of claim 10, wherein the locking member is a piece of plastic positioned proximate the adjustable valve.

12. The method of claim 9, wherein the motor assembly is used to move adjustable valves within multiple expansion devices.

13. The method of claim 9, wherein the predetermined stop position is based on a capacity of the sealed system.

14. The method of claim 9, wherein the motor assembly comprises a stepper motor.

15. The method of claim 9, wherein installing the expansion device comprises:

brazing the expansion device onto fluid conduit extending between the indoor heat exchanger and the outdoor heat exchanger.

16. The method of claim 9, wherein the sealed system is part of an air conditioner or a refrigeration system.

17. An air conditioner unit, comprising:
an outdoor heat exchanger;
an indoor heat exchanger;
a compressor operable to urge a flow of refrigerant through the indoor heat exchanger and the outdoor heat exchanger;
an expansion device comprising an adjustable valve, the expansion device fluidly coupling the indoor heat exchanger to the outdoor heat exchanger;
a removable motor assembly for moving the adjustable valve to a predetermined stop position based on a capacity of the air conditioner unit; and
a locking member positioned proximate the adjustable valve, the locking member being meltable to lock the adjustable valve in the predetermined stop position.

* * * * *